No. 646,049. Patented Mar. 27, 1900.
E. M. FRASER.
ELEVATOR.
(Application filed Nov. 27, 1896.)
(No Model.)

WITNESSES
Fabius T. Finch
A. H. Ste. Marie.

INVENTOR
Ethelbert M. Fraser.

UNITED STATES PATENT OFFICE.

ETHELBERT M. FRASER, OF SAN FRANCISCO, CALIFORNIA, ASSIGNOR, BY MESNE ASSIGNMENTS, TO THE OTIS ELEVATOR COMPANY, OF NEW JERSEY.

ELEVATOR.

SPECIFICATION forming part of Letters Patent No. 646,049, dated March 27, 1900.

Application filed November 27, 1896. Serial No. 613,653. (No model.)

*To all whom it may concern:*

Be it known that I, ETHELBERT M. FRASER, of the city and county of San Francisco, in the State of California, have invented a new and useful Improvement in Elevators, of which the following is a specification.

This invention forms part of an elevator system originated by me and comprising a car, cage, or platform, two driving-pulleys capable of being driven at the same and also at relatively-different rates of circumferential speed, and an endless cable that passes around both of said driving-pulleys and which is connected with said car, cage, or platform, so as to control its actions, all of said parts being so arranged and combined that the said driving-pulleys and said endless cable will each run continuously in one direction and the said car, cage, or platform will remain stationary when the said driving-pulleys are running at the same relative rates of circumferential speed, but will move either upward or downward when the relative rates of circumferential speed of said driving-pulleys are changed, so that one of them will run either faster or slower than the other.

Reference is had to the drawings hereto annexed for a detailed description of my said improvement.

Figure 1:
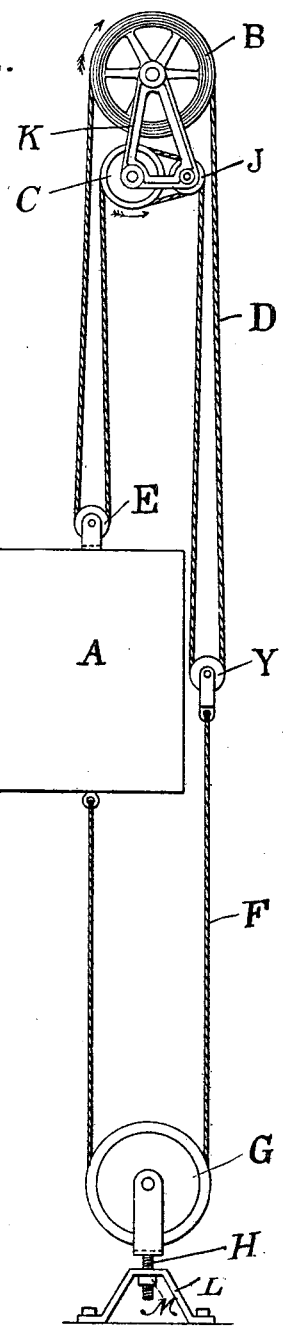
Figure 2:
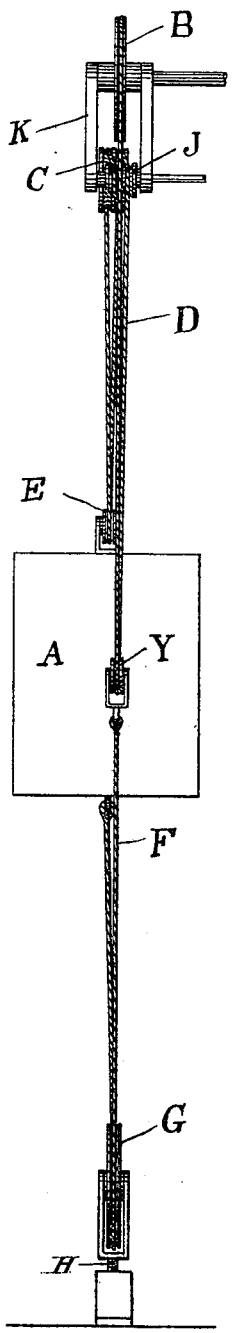

In said drawings, Figure 1 is an elevation, and Fig. 2 is a similar view taken at right angles to said Fig. 1.

Similar letters of reference refer to corresponding parts in both views.

A represents the load to be moved, which may be a cage, car, or platform of any approved design adapted to go up and down in any suitable shaft, well, or hoistway.

B and C are two driving-pulleys which I provide for moving the load. These pulleys may be driven by any suitable power.

D is an endless cable which is placed upon the driving-pulleys B and C, so as to be controlled thereby, and thence is led to and passed around two traveling pulleys E and Y on opposite sides of said pulleys B and C. The traveling pulley E is attached to the load A.

F is an ordinary cable attached to the traveling pulley Y at one end and to the load A at its other end. This cable passes around a friction-pulley G, which is held by a device H, that is bifurcated at its upper part to receive said pulley G and is formed into a screw-bolt at its lower part. The screw part of this device passes through a fixed bracket L and is secured to said bracket by a nut M. This device that carries the pulley G may be drawn downward by the screw and nut thereon, and it thereby serves as a tension apparatus for holding taut the cables D and F.

I provide the following-described means for obtaining additional frictional adhesion of the endless cable D to the driving-pulley C, to wit: The driving-pulley C is made with several grooves in its periphery for the endless cable to run in. An additional pulley J, having the same number of grooves, less one, for the same cable to run in, is placed in the hanger K, as shown. The endless cable runs around both the pulleys C and J in the several grooves that are in their peripheries, and thereby additional frictional adhesion to the driving-pulley is obtained for the cable. This is a well-known method of obtaining additional frictional adhesion for power-transmitting cables and ropes, and I do not claim the same except as one of the mechanical elements used in the new combinations which I have formed in creating my improved elevator. I have shown this additional pulley for obtaining more friction applied only to the driving-pulley C; but it can be applied in the same manner to the other driving-pulley B without further invention.

The operation is as follows, viz: The driving-pulleys B and C are set in motion in the directions shown by the arrows in Fig. 1. If they are driven so as to revolve both at the same rate of circumferential speed, the endless cable will run throughout its entire length at one and the same uniform rate of speed, and the load A will not be moved in either direction, but will remain stationary. To raise the load A, either the circumferential speed of the driving-pulley B is increased or else the circumferential speed of the driving-pulley C is decreased. In either case the part of the cable that is running over the driving-pulley B will run faster than that part of the cable which is running over the other driving-pulley C. This change in the relative circumferential speed of the driving-pulleys will cause the load A to be drawn upward. By reversing the relative circumferential speed of the driving-pulleys the load A will descend by its own gravity.

I do not claim, broadly, herein the elevator system hereinbefore referred to, of which the above-described improvement is only a part, as the same is fully covered by my Patent No. 610,481, issued September 6, 1898; but

What I claim here, and now desire to secure by Letters Patent, is—

1. The combination in an elevator of two driving-pulleys which are capable of being driven at the same and also at different relative rates of circumferential speed, a load that is to be raised or lowered, an endless cable that passes around both of said driving-pulleys and has therein bights or loops, two traveling pulleys. the first of which pulleys is attached to the load and is carried in one of said loops or bights of the endless cable and the second of which is carried in another of the loops or bights of the endless cable, a stationary friction-pulley, and a cable that is attached at one of its ends to the load and from thence passes downward to and around the said stationary friction-pulley and returning upward is attached at its other end to the said second traveling pulley so as to hold the endless cable taut and prevent its slipping on the driving-pulleys, all of said parts being so arranged and combined that the said driving-pulleys and said endless cable will each run continuously in one direction, and the said load will remain stationary when the said driving-pulleys are running at the same relative rate of circumferential speed but will move either upward or downward when the relative rates of circumferential speed of the driving-pulleys are changed so that one of them will run either faster or slower than the other, all substantially as herein set forth and described.

2. The combination in an elevator of two driving-pulleys which are capable of being driven at the same and also at different relative rates of circumferential speed, a load that is to be raised or lowered, and an endless cable that passes around both of said driving-pulleys and which is connected with said load so as to control its actions, with an additional idler-pulley for increasing the frictional adhesion of the endless cable to the driving-pulleys, all of said parts being so arranged and combined that the said driving-pulleys and said endless cable will each run continuously in one direction and the said load will remain stationary when the driving-pulleys are running at the same relative rate of circumferential speed but will move either upward or downward when the relative rates of circumferential speed of the driving-pulleys are changed so that one will run either faster or slower than the other, all substantially as herein set forth and described.

3. The combination in an elevator of a car, cage, or platform with a traveling friction-pulley at its upper part for lifting it, two driving-pulleys that are capable of being driven at the same and also at different relative rates of circumferential speed, an endless cable running around said traveling pulley and around both of said driving-pulleys, another traveling pulley that is carried in the bight of said endless cable that is beyond the driving-pulleys from said car, cage, or platform, a cable that connects the second of said traveling pulleys with the bottom of said car, cage, or platform and passes around another friction-pulley that is stationary and located opposite to the said driving-pulleys, the said stationary friction-pulley, and a tightening apparatus, all being combined and arranged substantially as herein described and set forth, and so that the driving-pulleys and endless cable will each run continuously in one direction and the car, cage, or platform will remain stationary when the driving-pulleys are running at the same relative rates of circumferential speed but will move either upward or downward when the relative rates of circumferential speed of the driving-pulleys are changed so that one of them will run either faster or slower than the other.

In testimony whereof I affix my signature in presence of two witnesses.

ETHELBERT M. FRASER. [L. S.]

Witnesses:
 A. H. STE. MARIE,
 CHAS. T. STANLEY.